US009170756B2

(12) United States Patent
Jess et al.

(10) Patent No.: US 9,170,756 B2
(45) Date of Patent: Oct. 27, 2015

(54) METHOD AND SYSTEM FOR DYNAMIC STORAGE TIERING USING ALLOCATE-ON-WRITE SNAPSHOTS

(75) Inventors: Martin Jess, Erie, CO (US); Rodney A. DeKoning, Wichita, KS (US); Brian D. McKean, Longmont, CO (US)

(73) Assignee: LSI Corporation, San Jose, CA (US)

( * ) Notice: Subject to any disclaimer, the term of this patent is extended or adjusted under 35 U.S.C. 154(b) by 482 days.

(21) Appl. No.: 13/146,820

(22) PCT Filed: Mar. 31, 2009

(86) PCT No.: PCT/US2009/001998
§ 371 (c)(1),
(2), (4) Date: Jul. 28, 2011

(87) PCT Pub. No.: WO2010/087803
PCT Pub. Date: Aug. 5, 2010

(65) Prior Publication Data
US 2011/0283075 A1    Nov. 17, 2011

Related U.S. Application Data

(60) Provisional application No. 61/206,287, filed on Jan. 29, 2009.

(51) Int. Cl.
*G06F 13/00* (2006.01)
*G06F 3/06* (2006.01)

(52) U.S. Cl.
CPC .............. *G06F 3/0665* (2013.01); *G06F 3/061* (2013.01); *G06F 3/0641* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 6,170,037 B1 * | 1/2001 | Blumenau | 711/114 |
| 6,973,553 B1 | 12/2005 | Archibald et al. | |
| 7,181,578 B1 | 2/2007 | Guha et al. | |
| 7,191,304 B1 | 3/2007 | Cameron et al. | |
| 7,383,381 B1 | 6/2008 | Faulkner et al. | |
| 2002/0133681 A1 * | 9/2002 | McBrearty et al. | 711/165 |
| 2005/0097132 A1 | 5/2005 | Cochran et al. | |
| 2005/0240724 A1 | 10/2005 | Koizumi et al. | |
| 2007/0185912 A1 * | 8/2007 | Gupta et al. | 707/200 |
| 2008/0162843 A1 * | 7/2008 | Davis et al. | 711/162 |

(Continued)

FOREIGN PATENT DOCUMENTS

| | | |
|---|---|---|
| CN | 1776635 A | 5/2006 |
| CN | 1849577 A | 10/2006 |

(Continued)

OTHER PUBLICATIONS http://en.wikipedia.org/wiki/Snapshot_(computer_storage).*

*Primary Examiner* — Sean D Rossiter
(74) *Attorney, Agent, or Firm* — Suiter Swantz pc llo

(57) ABSTRACT

System and method for dynamic storage tiering are disclosed. A storage hot-spot in a first storage pool is detected. A first point-in-time copy of a virtual volume including the storage hot-spot is created in a second storage pool according to the detecting. Write requests directed to the virtual volume are redirected to the second storage pool. When decreased I/O activity directed to the storage hot-spot in the second storage pool is detected, the point-in-time copy in the second storage pool is reintegrated into at least one of a second point-in-time copy or the virtual volume.

21 Claims, 9 Drawing Sheets

(56) References Cited

U.S. PATENT DOCUMENTS

| | | | |
|---|---|---|---|
| 2008/0189572 A1* | 8/2008 | McBride et al. | 714/5 |
| 2008/0313364 A1 | 12/2008 | Flynn et al. | |
| 2010/0050013 A1* | 2/2010 | Soran et al. | 714/5 |
| 2010/0138620 A1* | 6/2010 | Jess | 711/162 |
| 2010/0325355 A1* | 12/2010 | Kezuka et al. | 711/112 |
| 2011/0078398 A1* | 3/2011 | Jess | 711/162 |
| 2011/0178972 A1* | 7/2011 | Navarro et al. | 706/47 |

FOREIGN PATENT DOCUMENTS

| | | |
|---|---|---|
| JP | 2008087450 | 4/1996 |
| JP | 2003108317 | 4/2003 |
| JP | 2005309739 | 11/2005 |
| TW | 224732 B | 12/2004 |

* cited by examiner

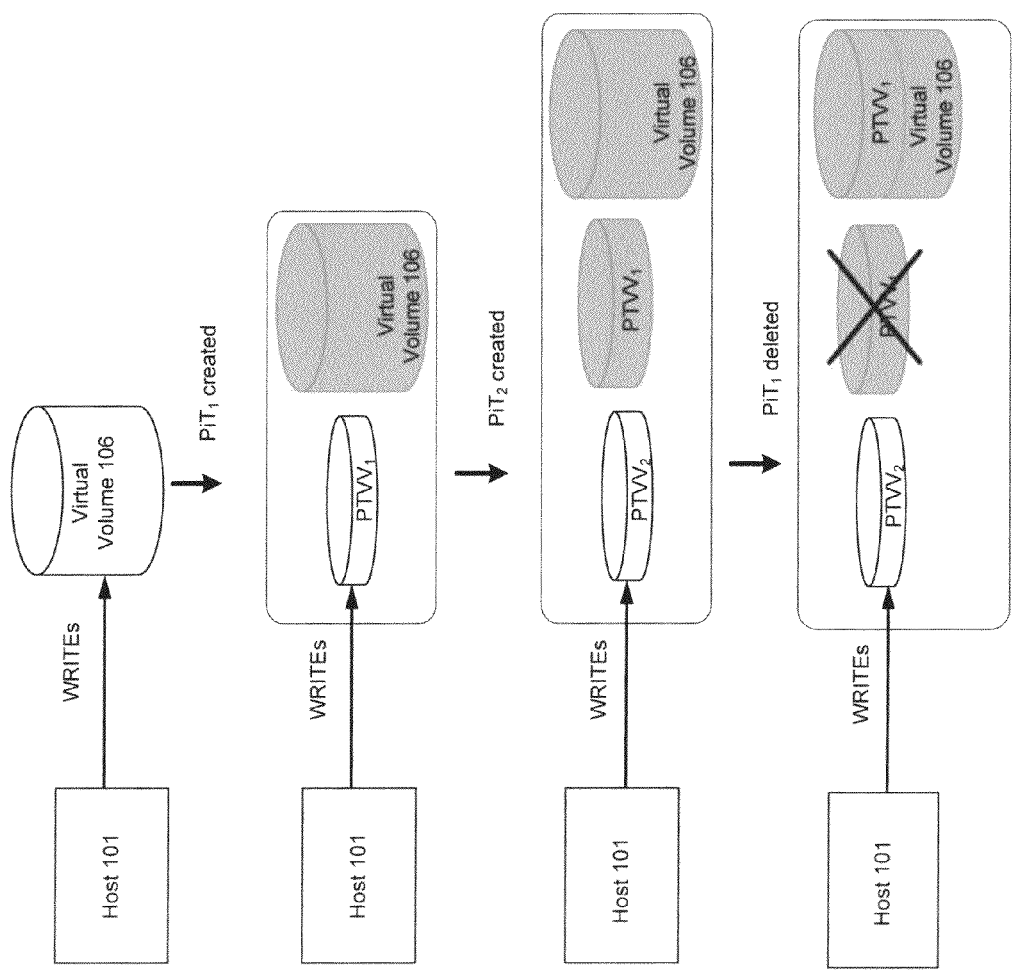

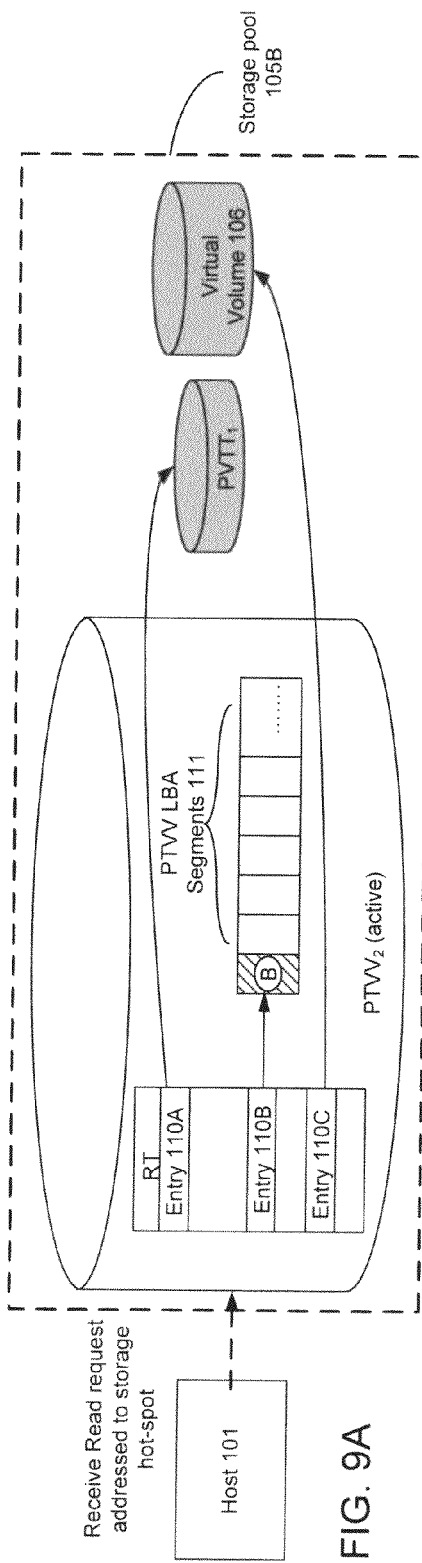
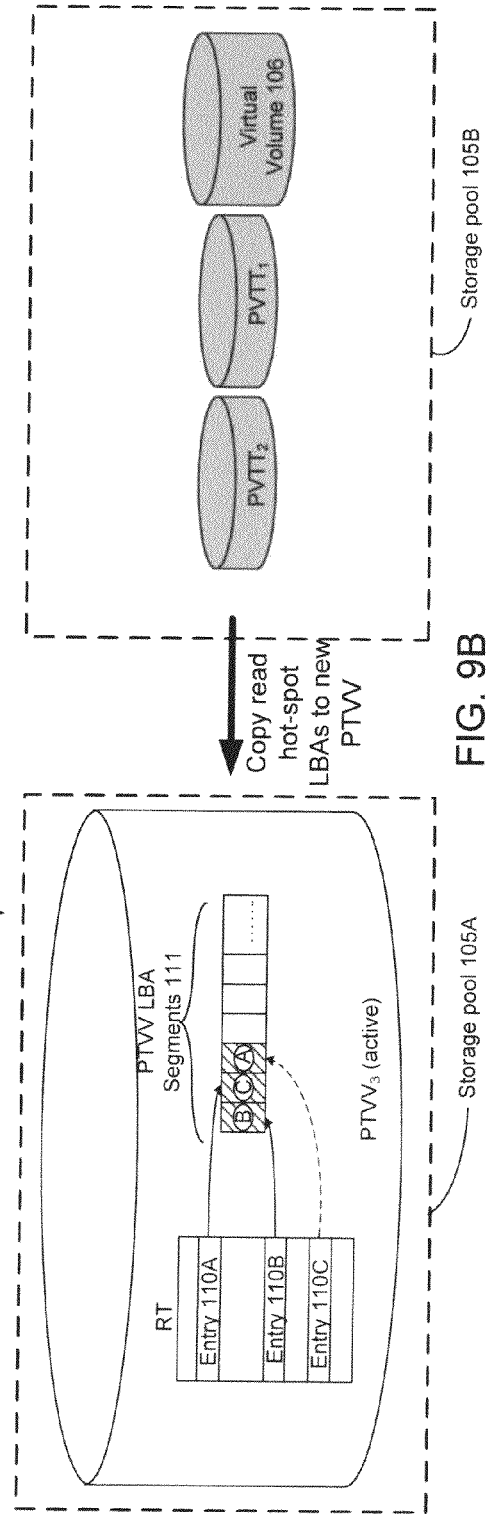
FIG. 9A
FIG. 9B

METHOD AND SYSTEM FOR DYNAMIC STORAGE TIERING USING ALLOCATE-ON-WRITE SNAPSHOTS

BACKGROUND

Dynamic Storage Tiering (DST) is a concept of grouping storage devices into tiers based on their performance characteristics and relocating data dynamically across the devices to leverage their specific capabilities. It is desirable that a DST system perform this relocation while data remains online and accessible.

For performance management, data that has a high activity or load level may be relocated it to high performing storage tiers. Alternately, data with a low activity level may be relocated to lower performing storage tiers in order to provide increased capacity in high-performance storage tiers.

SUMMARY

The present disclosure describes systems and methods for dynamic storage tiering A method for dynamic storage tiering may comprise: detecting a storage hot-spot located in a first storage pool; and creating a first point-in-time copy of a virtual volume including the storage hot-spot located in the first storage pool in a second storage pool according to the detecting.

A system for dynamic storage tiering may comprise: means for detecting a storage hot-spot located in a first storage pool; and means for creating a first point-in-time copy of a virtual volume including the storage hot-spot located in the first storage pool in a second storage pool according to the detecting.

BRIEF DESCRIPTION OF THE DRAWINGS

The numerous advantages of the disclosure may be better understood by those skilled in the art by reference to the accompanying figures in which:

FIG. 5 shows an operational flow associated with dynamic storage tiering.
FIGS. 9A and 9B show an operational flow associated with dynamic storage tiering.

DETAILED DESCRIPTION

Figure 1:
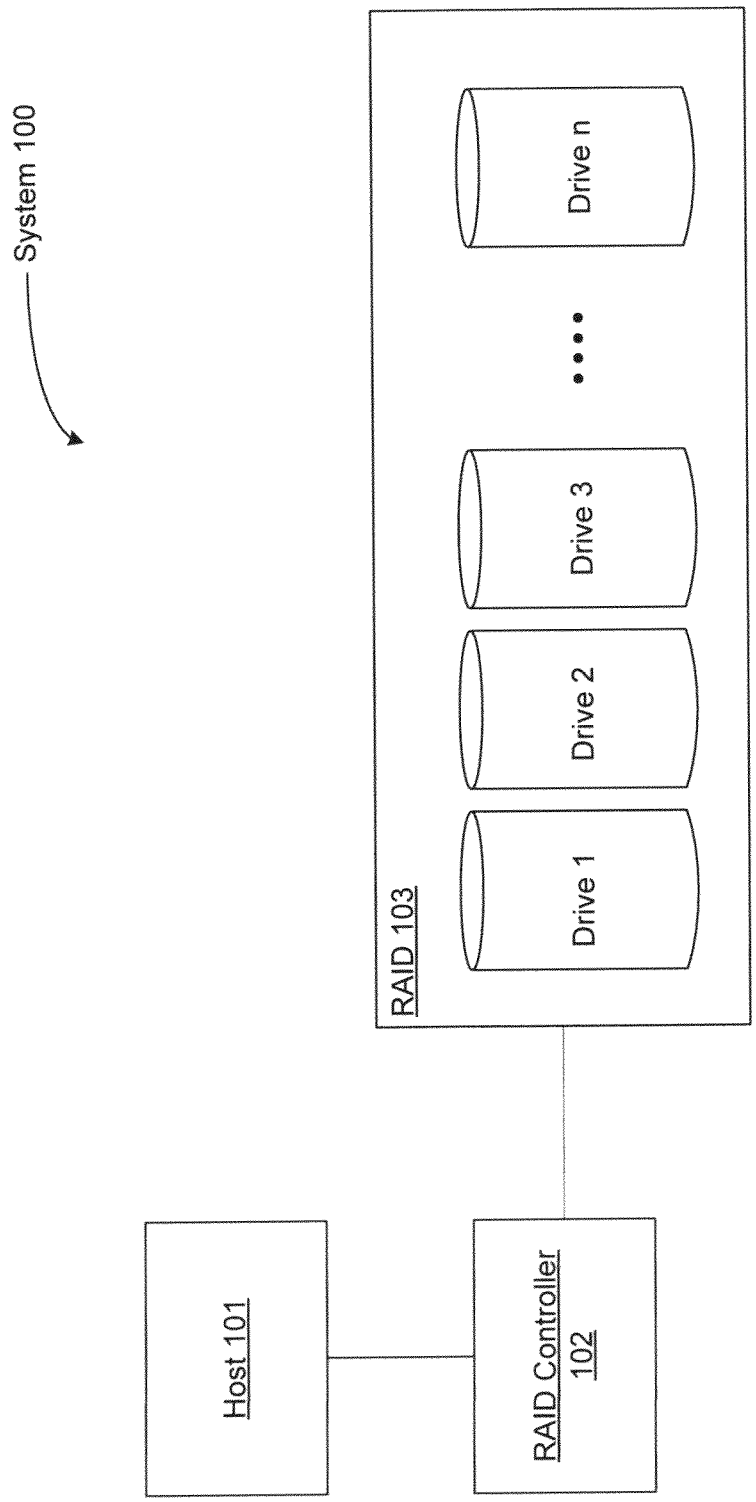
FIG. 1 shows a data storage system.

In the following detailed description, reference may be made to the accompanying drawings, which form a part hereof. In the drawings, similar symbols typically identify similar components, unless context dictates otherwise. The illustrative embodiments described in the detailed description, drawings, and claims may be not meant to be limiting. Other embodiments may be utilized, and other changes may be made, without departing from the spirit or scope of the subject matter presented here.

Referring to FIG. 1, an illustrative representation of a mass storage system 100 comprising a host 101 computing device, a RAID controller 102, and a RAID 103 is shown. The RAID controller 102 may include volume management circuitry/software whereby the RAID controller 102 can process read/write requests of the host 101 accessing various logical volumes configured on the RAID 103. The RAID 103 may include a drive group having n drives.

Figure 2:
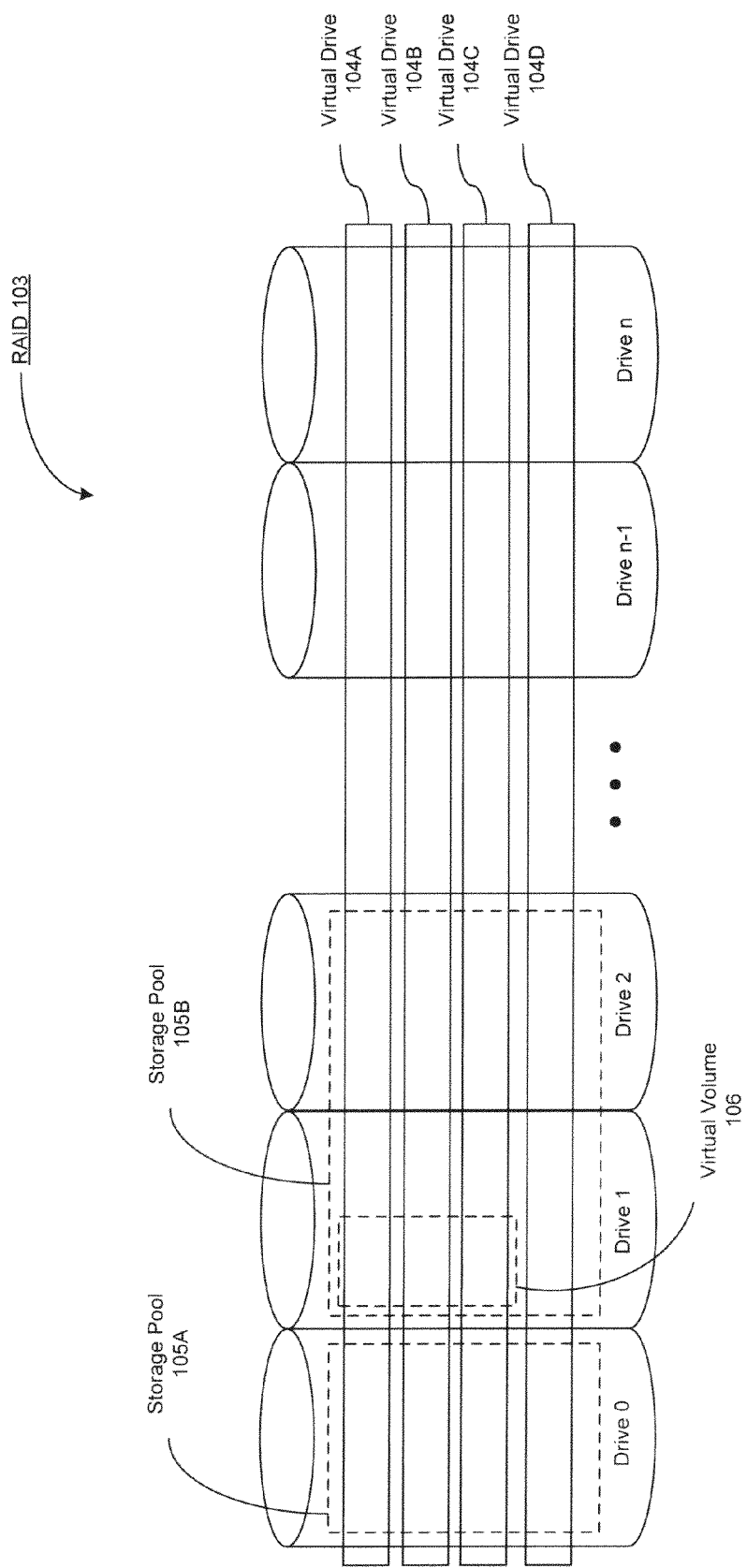
FIG. 2 shows a data storage system.

Referring to FIG. 2, one or more physical drives (e.g. drive 0-drive n) may be logically partitioned into one or more virtual drives (e.g. virtual drive 104A-virtual drive 104D of RAID 103). Portions of one or more virtual drives may be further partitioned into storage pools (e.g. storage pool 105A, storage pool 105B, etc.). A storage pool may be defined as one or more physical drives (or one or more logical partitions of the one or more physical drives) which have similar performance characteristics. For example, storage pool 105A (i.e. drive 0) may include high-performance Solid State Drives (SSDs) whereas storage pool 105B (i.e. drive 1 and drive 2) may include lower performance devices such as Serial ATA (SATA) Hard Disk Drives (HDDs). Factors which may distinguish higher-performance storage pools from lower-performance storage pools may include numbers of I/O operations processed per unit time, number of bytes read or written per unit time, and/or average response time for an I/O request.

In order to enhance overall system performance, it may be desirable to allocate data having a high activity level (e.g. I/O requests are addressed to the data at a high frequency) to high-performance storage pools and/or allocating data with a low activity levels (e.g. I/O requests are addressed to the data at a low frequency) to lower-performance storage pools. To affect an efficient DST solution, the size of the data blocks moved between storage pools may be smaller than a complete SCSI logical unit (LU).

For a given LU, data with a high activity level may be identified as a logical block address (LBA) range within an LU. Such an LBA range with significant activity load compared to the rest of the LU may be referred to as a hot-spot. A LU may contain more than one hot-spot.

A storage pool in which hot-spot currently exists may be referred to as a source storage pool. A storage pool that a hot-spot may be moved to may be referred to as a destination storage pool. It should be noted that hot-spots may refer data which is accessed frequently and may be moved to a higher-performance storage pool or data which is accessed infrequently and may be moved to a lower-performance storage pool. Alternately, data that is accessed infrequently may be referred to as a cold-spot and may be moved to a lower-performance storage pool utilizing the same systems and methods as described herein with respect to hot-spot movement.

A hot-spot may be identified by the RAID controller 102 by monitoring the address locations for I/O requests received from the host 101. Upon exceeding a I/O request threshold (e.g. exceeding a specified request rate, number of requests, etc.), for a particular segment of LBAs in a given storage pool those LBAs may be designated as a hot-spot and subject to relocation to a storage pool having alternate performance characteristics.

Referring to FIG. 2, a virtual volume 106 may be provisioned from the capacity of one or more storage pools. For example, storage pool 105B may include LBAs from one or more virtual drives (e.g. virtual drive LBA segment 107A of the portion of virtual drive 104A allocated to physical drive 0; virtual drive LBA segment 107B of the portion of virtual drive 104B allocated to physical drive 1; virtual drive LBA segment 107C of the portion of virtual drive 104C allocated to physical drive 2; etc.)

Figure 3:
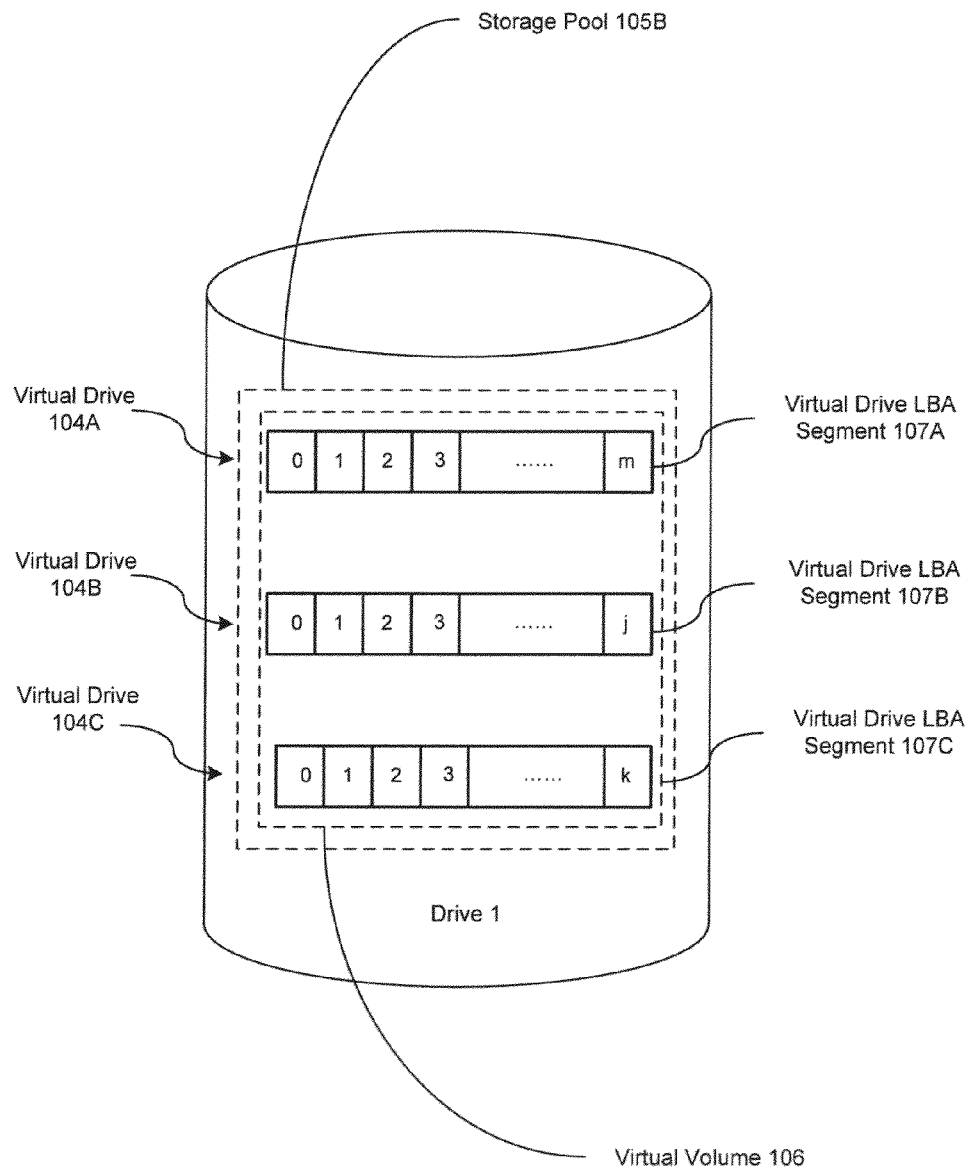
FIG. 3 shows a data storage system.
Figure 4:
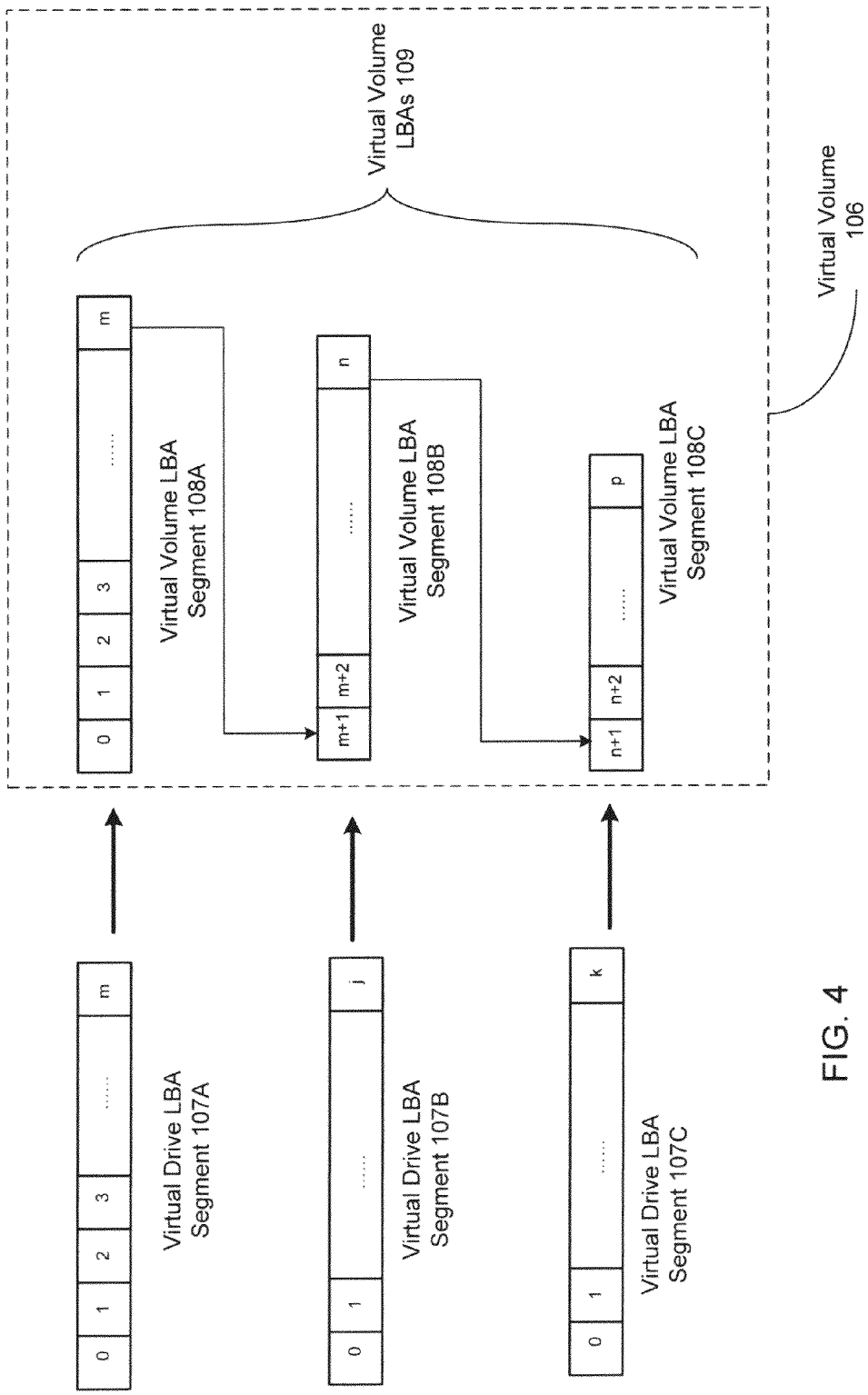
FIG. 4 shows a data storage system.

Referring to FIGS. 3 and 4, a virtual volume may be mapped to one or more LBA ranges in one or more virtual drives (e.g. virtual drive segments). When a virtual volume is provisioned from one or more storage pools, a virtual volume LBA segment may be created for each mapping of a virtual volume LBA range to a virtual drive LBA range. For example, a virtual volume LBA segment 108A may include LBAs 0 through m which are mapped to LBAs 0 through m of virtual drive 104A. A virtual volume LBA segment 108B may include LBAs m+1 through n which are mapped to LBAs 0 through j of virtual drive 104B. A virtual volume LBA segment 108C may include LBAs n+1 through p which are mapped to LBAs 0 through k of virtual drive 104C.

Referring to FIG. 5, the mass storage system 100 may further implement snapshot functionality. Snapshot functionality allows for the creation and storage of one or more point-in-time (PiT) copies of a virtual volume (e.g. virtual volume 106A). When a PiT is created for a virtual volume, the contents of the virtual volume may frozen and a PiT Temporary Virtual Volume (PTVV) may be created that records all changes made to the virtual volume after the PiT was taken. Consequently, the original contents of the virtual volume are preserved at the time the PiT was created. Such a snapshot mechanism may be referred to as allocate-on-write or redirect-on-write (collectively "allocate-on-write") snapshots. Further, subsequent PiTs may be created for a given PTVV where a current PTVV is frozen and a new PTVV is created.

FIGS. 5-9 further illustrate operational flows representing example operations related to dynamic storage tiering. In FIGS. 5-9, discussion and explanation may be provided with respect to the above-described examples of FIGS. 1-4, and/or with respect to other examples and contexts. However, it should be understood that the operational flows may be executed in a number of other environments and contexts, and/or in modified versions of FIGS. 1-4. In addition, although the various operational flows are presented in the sequence(s) illustrated, it should be understood that the various operations may be performed in other orders than those which are illustrated, or may be performed concurrently.

A hot-spot may be detected by the RAID controller 102 by monitoring the addressed storage locations for I/O requests received from the host 101. Upon exceeding an I/O request threshold (e.g. exceeding a specified request rate, number of requests, etc.), for a particular segment of LBAs in a given storage pool, those LBAs may be designated as a hot-spot and subject to relocation to a storage pool having alternate performance characteristics. Hot-spots may be characterized as write hot spots (e.g. an LBA range where the majority of I/Os are writes) and read hot-spots (e.g. an LBA range where the majority of the I/Os are reads). It should be noted that write hot-spots need not be composed exclusively of write activity. Similarly, read hot-spots need not be composed exclusively or read activity.

Figure 6A:
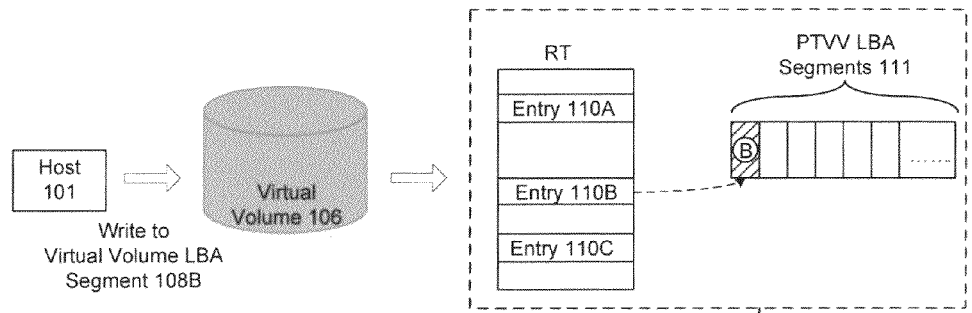
FIGS. 6A-6C show an operational flow associated with dynamic storage tiering.
Figure 6B:
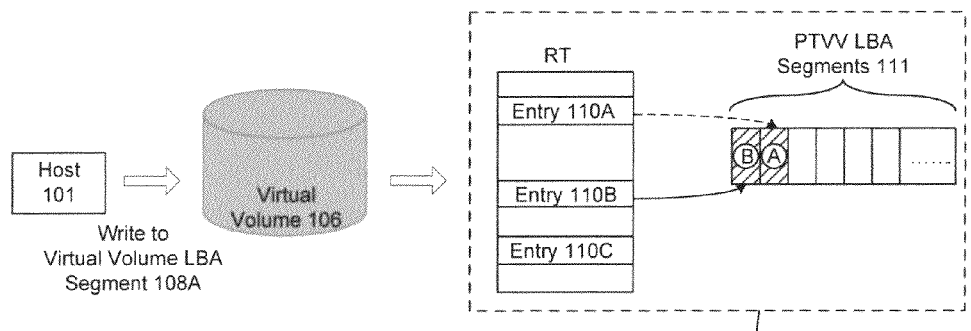
Figure 6C:
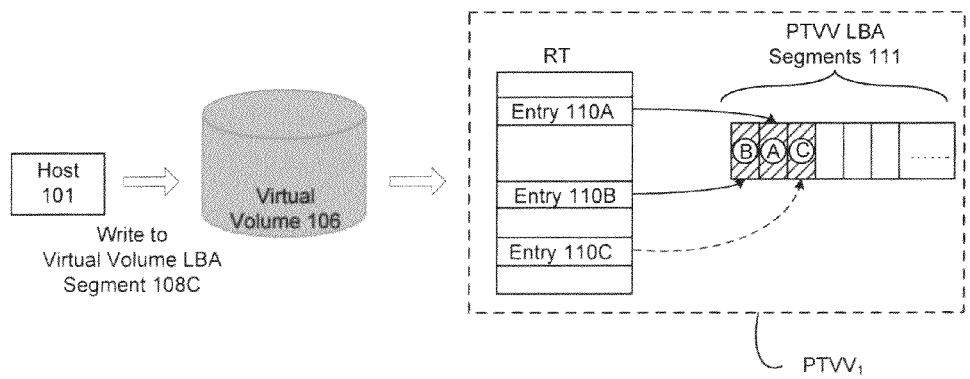
Figure 7:
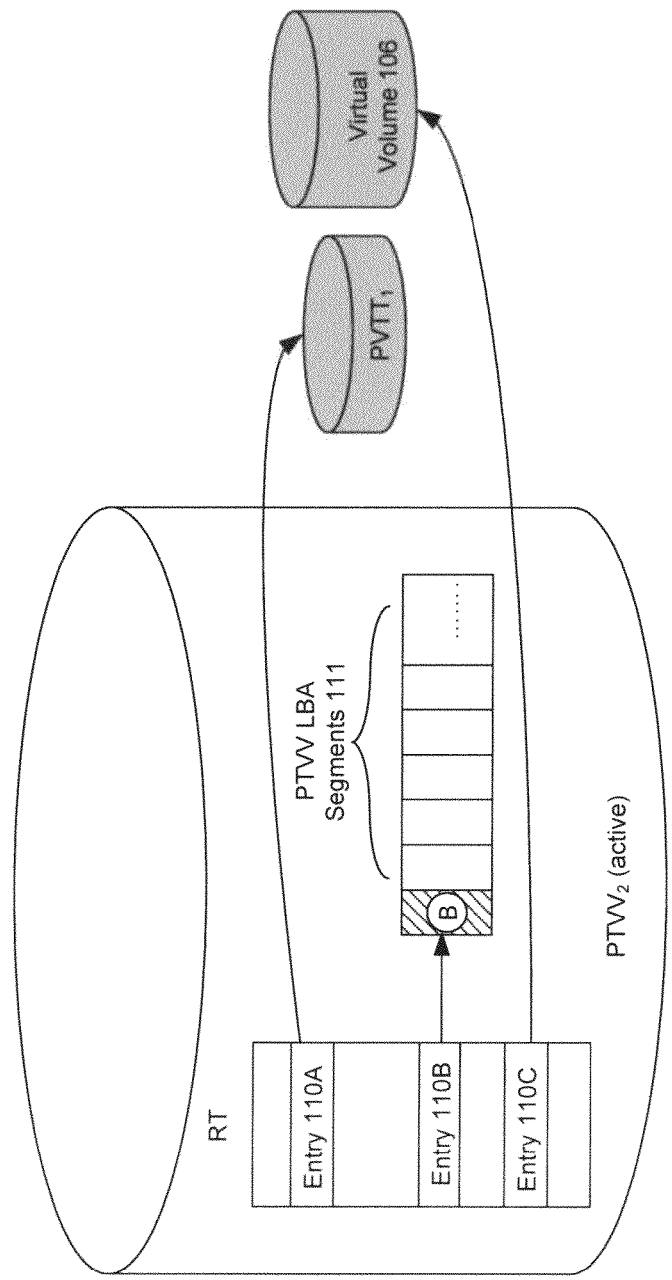
FIG. 7 shows an operational flow associated with dynamic storage tiering.

Referring to FIG. 5-7, an operational flow illustrating creating a first point-in-time copy of a virtual volume including the storage hot-spot located in the first storage pool in a second storage pool according to the detecting is shown. A first PiT (e.g. PiT$_1$) operation may occur which may freeze the contents of an original virtual volume containing a hot-spot (e.g. virtual volume 106A) and a first PTVV (e.g. PTVV$_1$) may be created. Following creation of the PTVV, I/O operations from a host (e.g. host 101) addressed to the virtual volume including the hot-spot may be directed to the PTVV, as presented below. The most recent PiT may be referred to as an "active" PiT as all current I/O operations are directed to its associated PTVV.

Subsequently, a second hot-spot may be detected within the PTVV$_1$. A second PiT (e.g. PiT$_2$) operation may occur which may freeze the contents of PTVV$_1$ and a second PTVV (e.g. PTVV$_2$) may be created. Following creation of the second PTVV, I/O operations from the host to the virtual volume may be directed to the active PTVV (e.g. PTVV$_2$).

Upon deletion of a PiT (e.g. Pit$_1$), the original virtual volume (e.g. virtual volume 106) may be reconfigured such that the contents of the portions of the original volume which were addressed by write requests during the existence of the PiT are updated to correspond with the PTVV. For example, the LBAs of the virtual volume 106 which are addressed by write requests to during the existence of the PiT may be copied to the LBAs of the virtual volume 106.

The virtual volume LBA range may be logically divided into same-sized virtual volume LBA segments (e.g. virtual volume LBA segment 108), the size of a virtual volume LBA segment correlates to the PiT granularity which is an attribute of a virtual volume. Thus, each virtual volume LBA segment corresponds to an LBA range of within the original virtual volume. A re-allocation Table (RT) containing a mapping to each virtual volume LBA segment in the virtual volume may be created for each PiT and stored in the beginning of a PTVV associated with that PiT. When a write request that addresses one or more LBAs of a virtual volume LBA segment is received from a host after a PiT has been created, the corresponding entry in the RT for the active PiT is marked "allocated", the virtual volume LBA segment may be placed in the PTVV at the next available LBA, and the RT entry for that virtual volume LBA segment mapped to the PTVV LBA segment.

For example, as shown in FIGS. 6A-6C, a host 101 may issue one or more write commands addressed to one or more LBA segments of a virtual volume (e.g. virtual volume LBA segment 108B, virtual volume LBA segment 108A, virtual volume LBA segment 108C, etc.) An entry for each addressed virtual volume segment may be made in the RT location corresponding to the respective virtual volume LBA segments (e.g. Entry 110B, Entry 110A, Entry 110C, etc.) The write operations may then be directed to the next available PTVV LBA segment (e.g. PTVV LBA segment 111B, PTVV LBA segment 111A, PTVV LBA segment 111C, etc.)

It should be noted that consecutive PTVV LBA segments may not necessarily correspond to consecutive virtual volume LBA segments as PTVV LBA segments may be placed in the in the order they are written and not ordered according to the LBA ranges the virtual volume LBA segments they are associated with.

Referring to FIG. 7, when a read request is received for a virtual volume, the RT for the active PiT may point to the most recent version of that virtual volume LBA segment. This can be the PTVV for the active PiT itself, a PTVV for an older PiT, or the original virtual volume. For example, as shown in FIG. 7, a virtual volume LBA segment may be written to active PTVV$_2$ (e.g. PTVV LBA segment 111B associated with RT Entry 110B) while other virtual volume LBA segments may have been last written when PTVV$_1$ was active (e.g. a PTVV LBA segment associated with Entry 110A) or prior to the creation of PiT$_1$ associated with PTVV$_1$ (e.g. an original virtual volume LBA segment of virtual volume 106).

Figure 8:
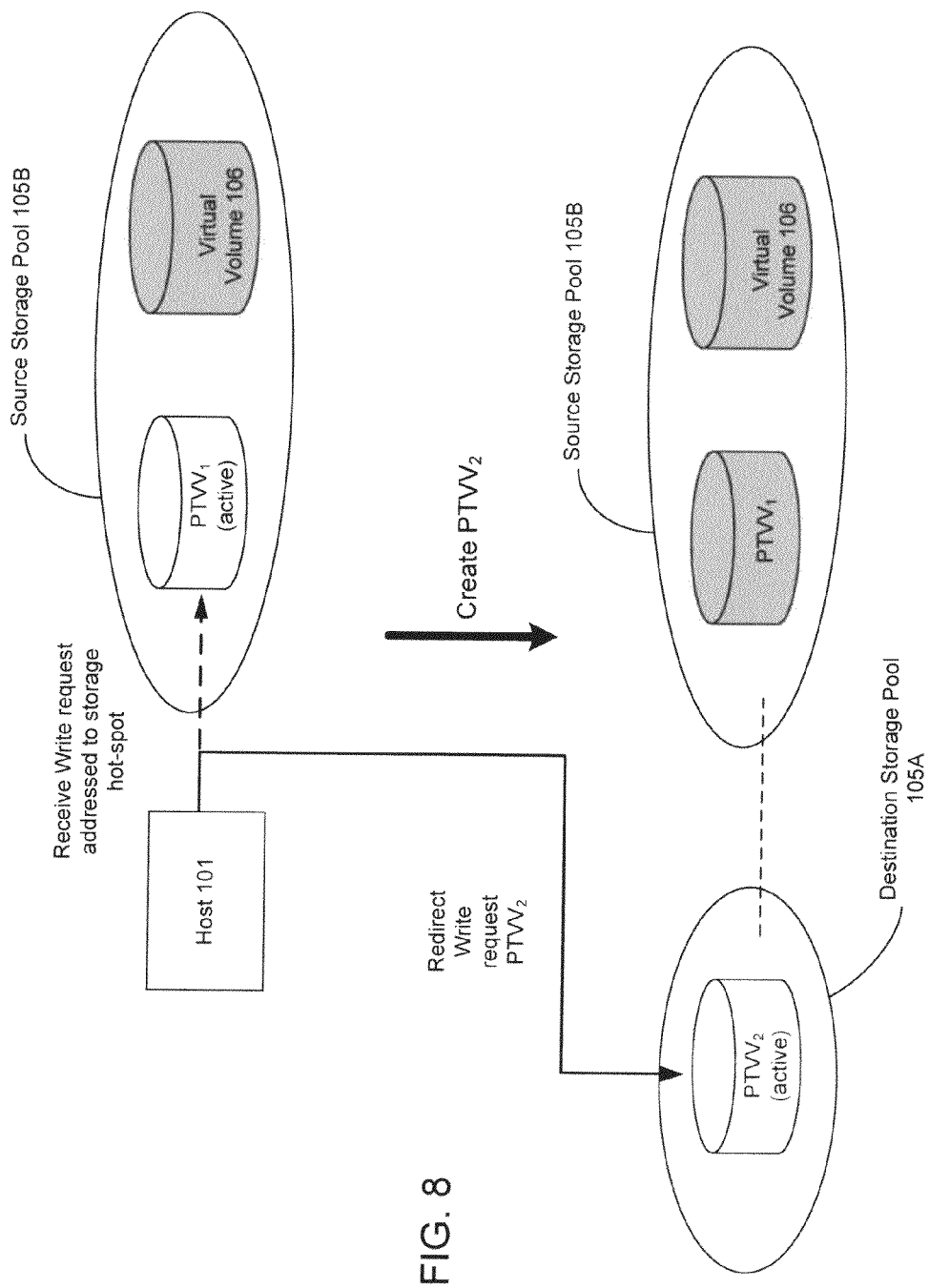
FIG. 8 shows an operational flow associated with dynamic storage tiering.

FIG. 8 shows redirecting write requests directed to the virtual volume including the storage hot-spot located in the first storage pool to the second storage pool. For example, a write hot-spot may be detected by the RAID controller 102 by monitoring the address locations for write requests received from the host 101. For a system employing the point-in-time copy methodology presented above, write I/O activity may be concentrated in the PTVV for the active (most recent) PiT. A hot-spot may be moved to a destination storage pool simply by creating a new PiT for the virtual volume in the destination storage pool. For example, as shown in FIG. 8, the host 101 may issue one or more write requests addressed to LBAs of a hot-spot located in an existing PTVV (e.g. $PTVV_1$) or an original virtual volume (e.g. virtual volume 106) which may be present in a lower performing storage pool (e.g. storage pool 105B). Upon receipt of the write request addressed to the LBAs of the hot-spot, a new PTVV (e.g. $PTVV_2$) may be created in a higher-performance storage pool (e.g. storage pool 105A) and the write request addressed to the hot-spot may be redirected to the new PTVV. As such, write I/O activity will continue to be concentrated in the active PTVV which now resides in the higher-performance storage pool.

If the write request activity level of the hot-spot should decrease to a level where use of a higher-performance storage pool is no longer necessary, the PiT associated with the active PTVV may be deleted and the contents of the active PTVV may be reintegrated into the previous PTVV. For example, if the activity in $PTVV_2$ decreases below a threshold level, the contents of $PTVV_2$ may be reintegrated into $PTVV_1$.

Further, it is possible that the write hot-spot activity does not actually decrease but instead moves to a different LBA range. In this case, the hot-spot LBAs may still be located in the faster destination storage pool but there may be PTVV LBA segments in the PTVV that no longer qualify as hot-spots and should be transferred to a lower-performance storage pool.

When a PiT is created for a write hot-spot as above, the RAID controller 102 may monitor the ratio of actual hot-spot LBAs in the PTVV in the destination storage pool and the total number of LBAS available in that PTVV. When the ratio of hot-spot LBAs to low-activity LBAs crosses a particular threshold (e.g. a user configurable threshold), the RAID controller 102 may create a new PiT in the destination storage pool to contain only the write hot-spot LBAs and nothing else. After a configurable time period, the "old" PiT in the destination storage pool may be deleted thereby freeing up the capacity occupied by the inactive chunks.

In the case of a read hot-spot, the subject virtual volume LBA range may be distributed over multiple PiTs associated with the virtual volume, as shown in FIG. 9A. Further, even if the read hot-spot is contained within a single PiT, the LBA ranges may not be consecutive in the PTVV, (i.e., the LBAs that constitute the read hot-spot may be spread across the PTVV). Additionally, the PTVV itself may be very large in some cases and it may be impractical to move an entire PTVV to a higher-performance storage pool.

FIGS. 9A and 9B show receiving a read request addressing one or more LBAs of the storage hot-spot of the virtual volume and copying the contents of the one or more logical block addresses of the storage hot-spot to the first point-in-time copy in the second storage pool. For example, the host 101 may issue one or more read requests addressed to LBAs of a hot-spot located in an existing PTVV (e.g. $PTVV_2$, $PTVV_1$, etc.) or an original virtual volume (e.g. virtual volume 106) which may be present in a lower performing storage pool (e.g. storage pool 105B). Upon receipt of the read request addressed to the LBAs of the hot-spot, a new PTVV (e.g. $PTVV_3$) may be created in a higher performing storage pool (e.g. storage pool 105A). The read request may be processed and then the contents of the LBAs of the hot-spot (e.g. LBAs of $PTVV_2$) of may be copied as PTVV LBA segments of the new PTVV. One mechanism for performing such a copy is to add a virtual volume level write operation after each host read operation for any LBAs that meet the following criteria: 1) the LBAs are subject to the host read operation; 2) the LBAs are not already contained in the new PTVV; and 3) the LBAs are within a hot-spot's LBA range.

Such a methodology takes advantage of the fact that the LBAs to be written to the PTVV may already be present in the RAID controller 102 cache due to the host read operation. The read LBAs corresponding to the hot-spot LBAs missing from the destination PTVV may not be released for further use until the additional write operation completes. The controller firmware may support a special type of write operation where the source of the write data is not a host but data blocks that are already in controller cache.

Further, Locking on the RT associated with the active PTVV (e.g. $PTVV_3$) may prevent conflicts between a RAID controller 102 initiated hot-spot LBA write and a host initiated LBA write.

As subsequent read requests are received for the hot-spot in the virtual volume, they may be directed to the LBAs of the new PTVV (e.g. $PTVV_3$) in the higher-performance storage pool.

It may be desirable to avoid overwriting any host written data in the new PTVV (e.g. $PTVV_3$) during the process of copying hot-spot LBAs from prior PTVVs and/or the original virtual volume. All LBAs in the hot-spot LBA range may not be immediately copied to the destination PTVV as this may overwrite data the host had attempted to write to the same LBA range of the higher-performance storage pool while the copy was taking place. As such, the read hot-spot may be moved to the destination storage pool using a process termed a PiT additive copy. In this case, LBAs within the read hot-spot LBA range may only be copied from the source to the destination PTVV if hot-spot LBAs have not previously been copied to the subject LBAs of the destination PTVV. If those LBAs have not been written to since the destination PTVV was created.

When a PiT is created for a read hot-spot as above, the RAID controller 102 may monitor the ratio of actual number of hot-spot LBAs in the PTVV in the destination storage pool and the total number of LBAs available in that PTVV. When the ratio of hot-spot LBAs to low-activity LBAs crosses a particular threshold (e.g. a user configurable threshold), the RAID controller 102 may create a new PiT in the destination storage pool to contain only the read hot-spot LBAs and nothing else using the additive copy methodology previously described. After a configurable time period, the "old" PiT in the destination storage pool may be deleted thus freeing up the capacity occupied by the low-activity virtual volume LBAs.

If the read request activity level of the read hot-spot should decrease to a level where use of a higher-performance storage pool is no longer necessary, the PiT associated with the active PTVV may be deleted and the contents of the active PTVV may be reintegrated into the previous PTVV. For example, if the activity in $PTVV_3$ decreases below a threshold level, the contents of $PTVV_3$ may be reintegrated into $PTVV_2$.

When a PiT is deleted, the virtual volume LBA segments in the corresponding PTVV may be reintegrated into a previous PiT or, if no other prior PiTs exist, into the virtual volume LBAs themselves. For example, the data in the LBAs of $PTVV_1$ may be copied to the LBAs of the virtual volume 106. Alternately, the LBAs of the virtual volume 106 which were addressed by read requests during the existence of the PiT may be remapped directly to the associated LBAs of the $PTVV_1$.

It is believed that the present invention and many of its attendant advantages will be understood by the foregoing description. It may be also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art may include progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

What is claimed is:

1. A method comprising:
   detecting a storage hot-spot located in a first storage pool;
   creating a first point-in-time copy of a virtual volume including the storage hot-spot located in the first storage pool in a second storage pool according to the detecting;
   freezing the contents of the virtual volume including the storage hot-spot in the first storage pool;
   redirecting write requests directed to the virtual volume including the storage hot-spot located in the first storage pool to the point-in-time copy in the second storage pool;
   monitoring a ratio of storage hot-spot logical block addresses (LBAs) to low activity LBAs of the first point-in-time copy; and
   when the ratio reaches a pre-determined, user-configurable threshold, creating a second point-in-time copy including only the storage hot-spot LBAs of the first point-in-time copy.

2. The method of claim 1, further comprising:
   detecting decreased input/output (IO) activity directed to the hot-spot in the second storage pool; and
   reintegrating the point-in-time copy in the second storage pool into at least one of a second point-in-time copy or the virtual volume.

3. The method of claim 1, further comprising:
   reintegrating non-hot-spot LBAs of the first point-in-time copy into the virtual volume.

4. The method of claim 1, wherein the creating a first point-in-time copy of a virtual volume including the storage hot-spot located in the first storage pool in a second storage pool according to the detecting further comprises:
   receiving a read request addressing one or more LBAs of the storage hot-spot of the virtual volume;
   copying the contents of the one or more logical block addresses of the storage hot-spot to the first point-in-time copy in the second storage pool.

5. The method of claim 4, wherein the copying the contents of the one or more logical block addresses of the storage hot-spot to the first point-in-time copy in the second storage pool further comprises:
   copying the contents of the one or more logical block addresses of the storage hot-spot to the first point-in-time copy in the second storage pool if the LBAs of the storage hot-spot have not previously been written to the second storage pool.

6. The method of claim 4, further comprising:
   monitoring a ratio of storage hot-spot logical block addresses (LBAs) to low activity LBAs of the first point-in-time copy;
   when the ratio reaches a pre-determined, user-configurable threshold, creating a second point-in-time copy including only the storage hot-spot LBAs of the first point-in-time copy.

7. The method of claim 6, further comprising:
reintegrating non-hot-spot LBAs of the first point-in-time copy into the virtual volume.

8. A system comprising:
means for detecting a storage hot-spot located in a first storage pool;
means for creating a first point-in-time copy of a virtual volume including the storage hot-spot located in the first storage pool in a second storage pool according to the detecting;
means for freezing the contents of an original virtual volume including the storage hot-spot in the first storage pool;
means for redirecting write requests directed to the virtual volume including the storage hot-spot located in the first storage pool to the point-in-time copy in the second storage pool;
means for monitoring a ratio of storage hot-spot logical block addresses (LBAs) to low activity LBAs of the first point-in-time copy;
means for when the ratio reaches a pre-determined, user-configurable threshold, creating a second point-in-time copy including only the storage hot-spot LBAs of the first point-in-time copy.

9. The system of claim 8, further comprising:
means for detecting decreased input/output (IO) activity directed to the hot-spot in the second storage pool; and
means for reintegrating the point-in-time copy in the second storage pool into at least one of a second point-in-time copy or the virtual volume.

10. The system of claim 8, further comprising:
means for reintegrating non-hot-spot LBAs of the first point-in-time copy into the virtual volume.

11. The system of claim 8, wherein the creating a first point-in-time copy of a virtual volume including the storage hot-spot located in the first storage pool in a second storage pool according to the detecting further comprises:
means for receiving a read request addressing one or more LBAs of the storage hot-spot of the virtual volume;
means for copying the contents of the one or more logical block addresses of the storage hot-spot to the first point-in-time copy in the second storage pool.

12. The system of claim 11, wherein the copying the contents of the one or more logical block addresses of the storage hot-spot to the first point-in-time copy in the second storage pool further comprises:
means for copying the contents of the one or more logical block addresses of the storage hot-spot to the first point-in-time copy in the second storage pool if the LBAs of the storage hot-spot have not previously been written to the second storage pool.

13. The system of claim 11, further comprising:
means for monitoring a ratio of storage hot-spot logical block addresses (LBAs) to low activity LBAs of the first point-in-time copy;
means for when the ratio reaches a pre-determined, user-configurable threshold, creating a second point-in-time copy including only the storage hot-spot LBAs of the first point-in-time copy.

14. The system of claim 13, further comprising:
means for reintegrating non-hot-spot LBAs of the first point-in-time copy into the virtual volume.

15. A system comprising:
circuitry for detecting a storage hot-spot located in a first storage pool;
circuitry for creating a first point-in-time copy of a virtual volume including the storage hot-spot located in the first storage pool in a second storage pool according to the detecting;
circuitry for freezing the contents of an original virtual volume including the storage hot-spot in the first storage pool;
circuitry for redirecting write requests directed to the virtual volume including the storage hot-spot located in the first storage pool to the point-in-time copy in the second storage pool;
circuitry for monitoring a ratio of storage hot-spot logical block addresses (LBAs) to low activity LBAs of the first point-in-time copy;
circuitry for when the ratio reaches a pre-determined, user-configurable threshold, creating a second point-in-time copy including only the storage hot-spot LBAs of the first point-in-time copy.

16. The system of claim 15, further comprising:
circuitry for detecting decreased input/output (IO) activity directed to the hot-spot in the second storage pool; and
circuitry for reintegrating the point-in-time copy in the second storage pool into at least one of a second point-in-time copy or the virtual volume.

17. The system of claim 15, further comprising:
circuitry for reintegrating non-hot-spot LBAs of the first point-in-time copy into the virtual volume.

18. The system of claim 15, wherein the creating a first point-in-time copy of a virtual volume including the storage hot-spot located in the first storage pool in a second storage pool according to the detecting further comprises:
circuitry for receiving a read request addressing one or more LBAs of the storage hot-spot of the virtual volume;
circuitry for copying the contents of the one or more logical block addresses of the storage hot-spot to the first point-in-time copy in the second storage pool.

19. The system of claim 18, wherein the copying the contents of the one or more logical block addresses of the storage hot-spot to the first point-in-time copy in the second storage pool further comprises:
circuitry for copying the contents of the one or more logical block addresses of the storage hot-spot to the first point-in-time copy in the second storage pool if the LBAs of the storage hot-spot have not previously been written to the second storage pool.

20. The system of claim 18, further comprising:
circuitry for monitoring a ratio of storage hot-spot logical block addresses (LBAs) to low activity LBAs of the first point-in-time copy;
circuitry for when the ratio reaches a pre-determined, user-configurable threshold, creating a second point-in-time copy including only the storage hot-spot LBAs of the first point-in-time copy.

21. The system of claim 20, further comprising:
circuitry for reintegrating non-hot-spot LBAs of the first point-in-time copy into the virtual volume.

* * * * *